Figure 1A:
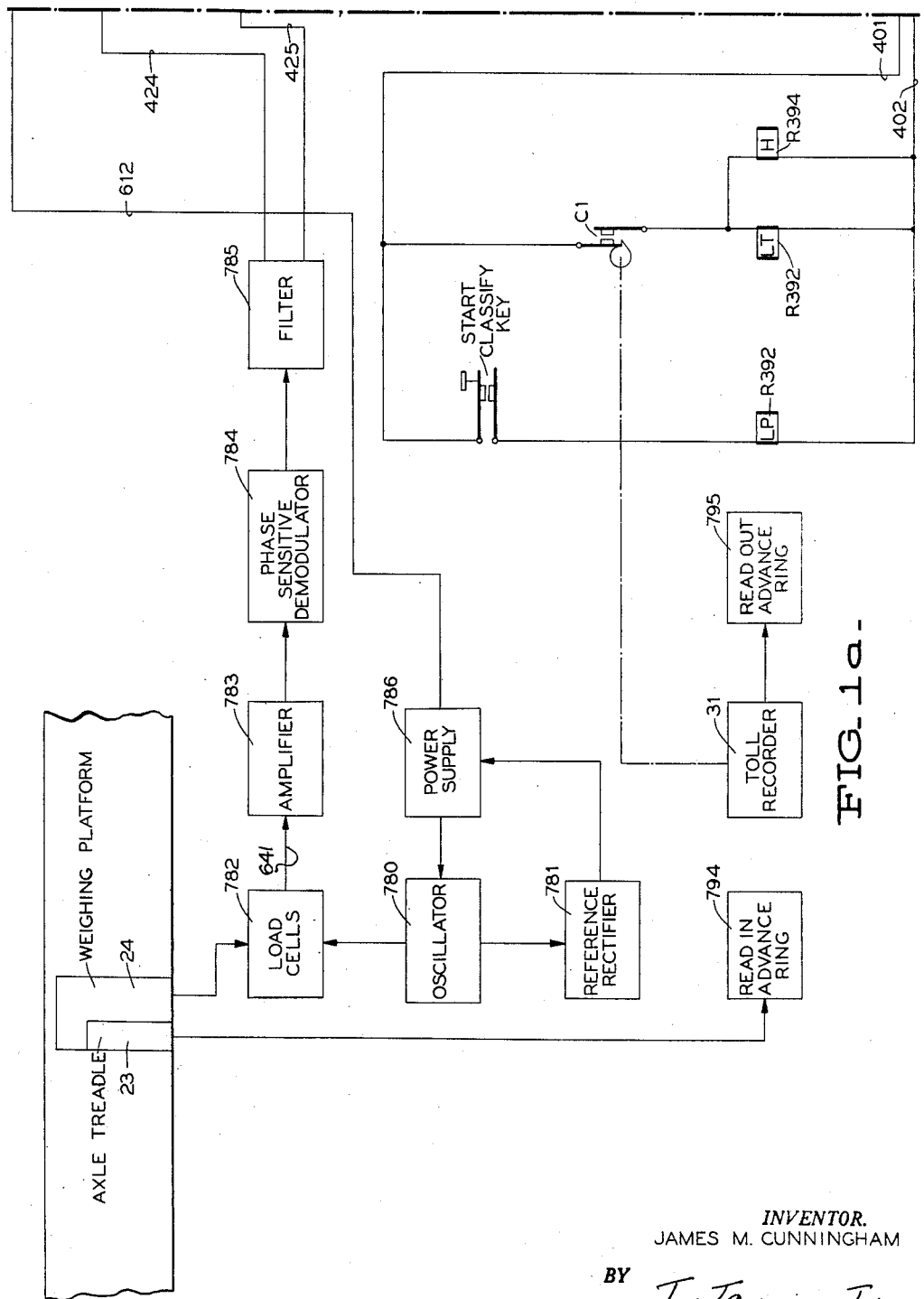

March 18, 1958  J. M. CUNNINGHAM  2,827,596
RELAY TIMING RING

Filed July 14, 1954  3 Sheets-Sheet 1

INVENTOR.
JAMES M. CUNNINGHAM
BY J. Janien Jr.
ATTORNEY

March 18, 1958   J. M. CUNNINGHAM   2,827,596
RELAY TIMING RING
Filed July 14, 1954   3 Sheets-Sheet 2

INVENTOR.
JAMES M. CUNNINGHAM
BY
J. Tancin Jr.
ATTORNEY

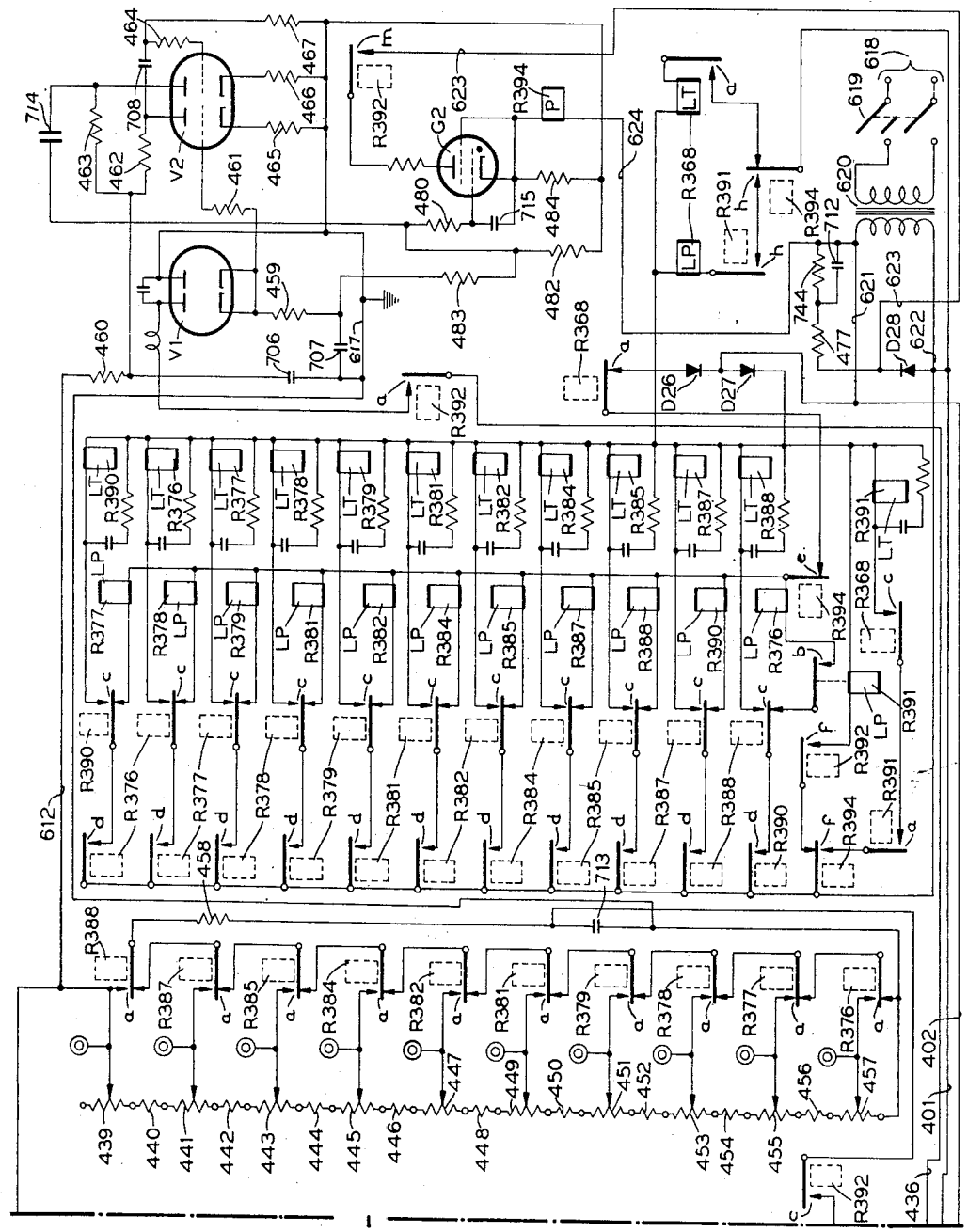

2,827,596

United States Patent Office

Patented Mar. 18, 1958

2,827,596

RELAY TIMING RING

James M. Cunningham, Endicott, N. Y., assignor to International Business Machines Corporation, New York, N. Y., a corporation of New York Application July 14, 1954, Serial No. 443,363

3 Claims. (Cl. 317—140)

This invention relates to relay timing rings and, particularly, to systems having a chain of relays arranged for successive operation.

A main object of this invention is to provide an improved relay timing system.

The present invention is particularly adapted to, but in no way limited to, use in a toll highway recorder system of the type shown and described in U. S. patent application Serial No. 443,264, filed on July 14, 1954, to have an axle weight storage unit including a plurality of condensers, one for each axle passing over a treadle and a weighing platform, wherein a dynamic weight axle voltage may be stored. The operation of these condensers is controlled by a condenser storage read-in ring circuit which always stays in step with the movement of axles over the treadle and a condenser storage readout ring circuit which always stays in step with an axles per vehicle grouping of the condensers, whereby the vehicular weight is obtained. During the dynamic weight classifying operation, the weight representing voltage of the axles per vehicle grouped condensers is compared in a step-by-step manner with a series of voltage standards, one of which will cause the step-by-step comparison operation to stop consequent upon a predetermined relationship between the vehicle weight representing voltage and the voltage standard. This step-by-step comparison is governed by a so-called ripple relay timing ring which is caused to advance in response to variations in polarity of an alternating current (A. C.) wave, for example a conventional power source sine wave.

Accordingly, another object of this invention is to provide an improved relay timing ring which is advanced in response to polarity variation of an A. C. wave.

Other objects of the invention will be pointed out in the following description and claims and illustrated in the accompanying drawings, which disclose, by way of examples, the principle of the invention and the best mode, which has been contemplated, of applying that principle.

Figure 1B:
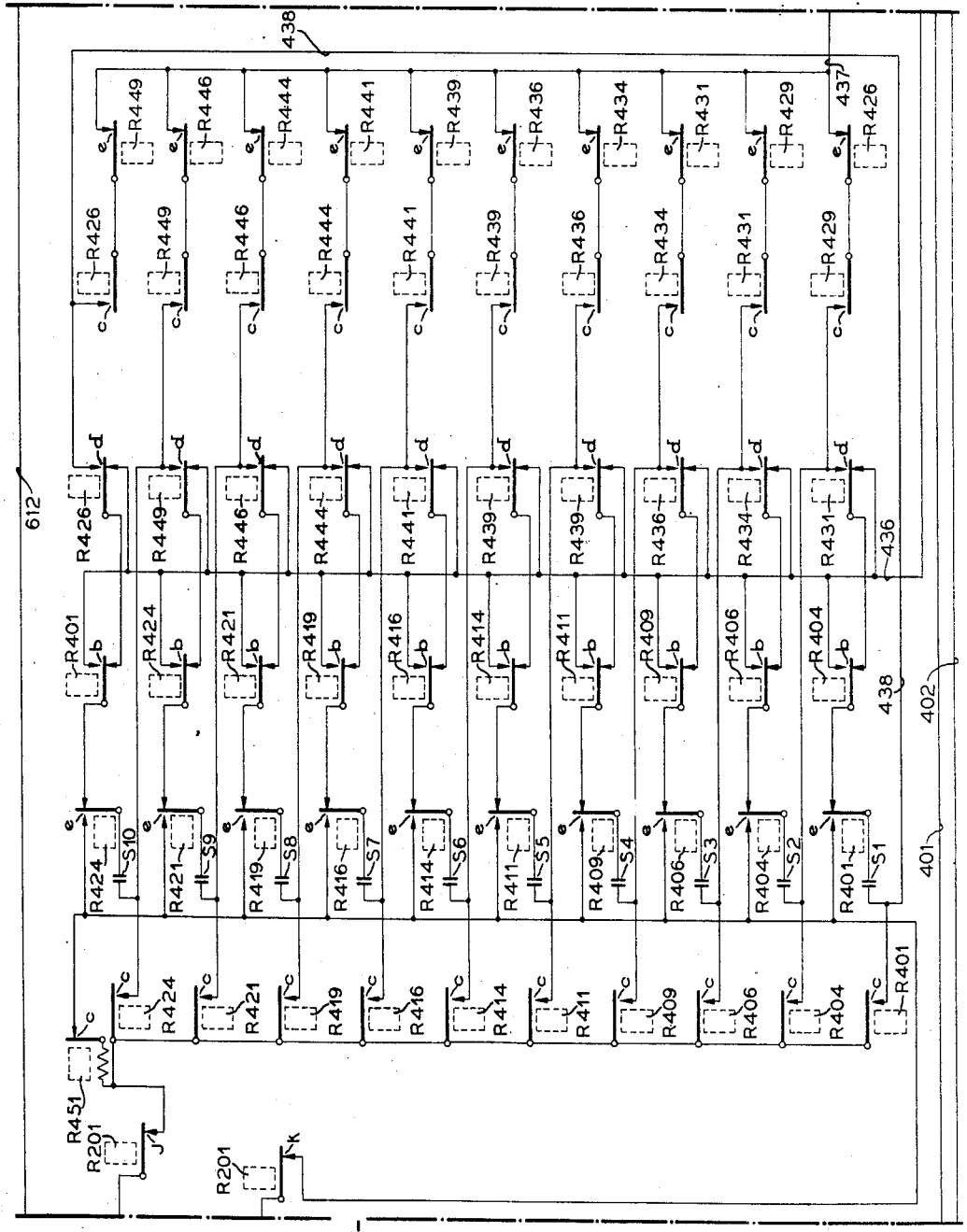

In the drawings:

Figs. 1a through 1c, taken together, constitute a schematic diagram, somewhat diagrammatic in character, of an electrical circuit wherein the present invention is used.

Inasmuch as the components of the toll highway recorder system shown in the accompanying drawings are not a part of this invention, they will be described only briefly herein.

A station toll recorder system located in the proximity of a weighing platform 24 and an axle treadle 23 causes the conversion of an applied axle load in pounds to a vehicle classification value which is determined by the relative magnitude of the voltage at the output of filter 785 and some predetermined portion of the reference voltage from power supply 786, more frequently referred to as a voltage standard.

The oscillator 780 generates a nearly constant amplitude voltage at a frequency of approximately 3 kc. This voltage is applied as an excitation voltage to load cells 782, as a control voltage to the reference rectifier 781, and as a control voltage to the demodulator 784. The output of the load cells 782 is an alternating current (A. C.) voltage which is proportional the axle load applied to weighing platform 24, and to the magnitude of the aforementioned excitation voltage.

The output of the load cells is amplified by amplifier 783 whose amplification is nearly constant. The output of amplifier 783, in turn, is rectified by a phase sensitive demodulator 784 whose output is a variable D. C. voltage which is filtered by filter 785, and stored in one of the weight storage capacitors S1 through S10 (see also Fig. 1) integral with filter 785.

Hence, the voltage stored in any one of the axle weight storage condensers will be proportional to the load applied, the magnitude of the excitation voltage, the amplification of amplifier 783, and the characteristics of the demodulator 784 at the period when the axle weight storage capacitor is last connected to the filter circuit. Such a storage condenser, or an axles per vehicle combination thereof, may be connected to a compare circuit in order to be compared to a portion of the reference voltage. This will result in a vehicle classification determination which is based on the axle load applied at the time when particular condensers were connected to filter 785.

The reference rectifier 781 is used to convert a portion of the A. C. oscillator voltage to a direct current (D. C.) voltage. This is used to control the magnitude of the reference power supply voltage along line 641. Thus the classification arrived at will be independent of the magnitude of the oscillator voltage.

The circuits for the afore-mentioned axle weight storage condensers are controlled so that only the signal voltage due to a single vehicle axle is stored in a single corresponding axle storage condenser. This control is provided by the read-in advance ring 794 having the relays R401 to R424 (not shown) for controlling contacts common to the said relays.

In order to obtain the total vehicle weight, it is necessary to add the individual vehicle axle weights. This is done by combining the storage condensers corresponding to the axles carried by a single vehicle so that the combined condenser voltages will represent the total vehicle weight. A readout advance ring having relays R426 to R449 (not shown) is employed to govern the operation of the weight storage output by controlling the operation of the contacts common to these relays.

As is shown in Fig. 1c, the primary winding of transformer 620 is connected to an A. C. power source 613 when the switch 619 is closed, to thereby cause an A. C. supply to be applied to the secondary transformer lines 621 and 622. As will be described in detail shortly, the classifying ripple timing circuit which includes coils R376LP through R390LP and R376LT through R390LT, is controlled so that a latch pick relay, for example R377LP, is energized during the period that line 622 is positive, and a latch trip relay, for example relay R377LT, is energized during the period that line 621 is positive.

Diode D28 is connected between lines 622 and 623 so that a positive voltage is applied to the plate of vacuum tube G2 whenever line 622 goes positive. Line 621, on the other hand, is connected between diodes D26 and D27 which channel the ripple circuit current so that the latch pick relays are energized during the positive portion of an A. C. wave, and the latch trip relays are energized during the other, or negative, portion of the A. C. wave.

A +250 volt potential is directed from a power supply 786 (see also Fig. 1a) along line 612 to the classifying compare circuit. The resistance values selected are such that the potentials available at each of the contacts R376a (Fig. 1c) through R388a are 0, +18.4, +24.6, +34, +47.4, +69.2, +93.2, +125.4, +168.4 and +250, respectively, to correspond with zero and 1 through 9 classes. Should it be desired to classify vehicles on a different weight per class basis, the voltages available as a comparison standard may be changed.

When start classify relay R392LP (Fig. 1a) is energized, start classify relay R391 (Fig. 1c) will be picked through a circuit including line 622, contacts 394f normally closed (n/c) and R392f, relay R391LP, diode D27, to line 621. Of course, inasmuch as relay R391 is a latch pick relay, the relay will remain picked mechanically until the latch trip coil thereof, coil R391LT, is energized.

During the time that line 622 is positive, immediately after relay R391 is caused to pick, a circuit will be completed to relay R376LP from line 622 through contacts R390d, R388c n/c and R391b, relay R376LP, contacts R394e and R368a, diode D26, to line 621. It must be pointed out here that relay R390 is the ripple circuit reset relay, and as will be described shortly, relay R390 is always picked after a classification determination when the classify ripple circuit is reset. Hence, relay R390 will always be up at the start of a new classification operation.

During the next polarity portion of the A. C. wave, i. e., during the period that line 621 is positive, relay R390LT will be energized from line 621 through diode D27, relay R390LT, contacts R390c normally open (n/o) and R376d, to line 622. During the next polarity portion of the A. C. wave when line 622 goes positive, relay R377LP will be energized from line 622 through contacts R376d and R390c n/c, relay R377LP, contacts R394e and R368b, diode D26, to line 621.

When line 621 goes positive once again, a circuit will be completed from line 621 through diode D27, relay R376LT, contacts R376c n/o and R377d, to line 622. In similar fashion, during each polarity portion of an A. C. wave as the lines 621 and 622 go positive alternately, the ripple circuit timing relays may be energized in a sequence which will continue with relays R378LP, R377LT, R379LP, R378LT, R381LP, R379LT, etc.

In short, the classifying ripple circuit timing ring described hereinabove is one wherein the latch pick coils are energized during the periods that line 622 goes positive, and the latch trip coils are energized during the periods that line 621 goes positive.

It may be stated here that were it not for end classify relay contacts R394e, the ripple circuit relay timing ring would continue to advance continuously in a closed loop. However, as will now be described, end classify relay contacts R394e are caused to open when the classification of the vehicle has been automatically determined on the basis of dynamic weighing as a result of a comparison between the vehicle weight representing voltage and the voltage standard available at the classifying compare circuit resistors 439 through 457.

The left plate of vacuum tube V1 shown in Fig. 1c is connected through a suitable choke to the relay contacts R392a, whereas the right plate of the said tube is connected to ground. The two plates are connected by a filter condenser, whereas the two cathodes thereof are interconnected at one end of resistor 459 and resistor 461. The other end of resistor 459 is connected to condenser 707 which, in turn, is connected to a condenser 706. The latter condenser is connected to +250 volt line 612 via resistor 460. The other end of resistor 461 is connected to the left control grid of vacuum tube V2, and the right control grid of this tube is connected to resistor 464 which, in turn, is connected to the common junction of condenser 708 and resistor 467. The right plate of vacuum tube V2 is connected to a point between resistor 463 and condenser 714. The other end of resistor 463 is connected to one end of resistor 460 and one end of resistor 462. This latter resistor is connected to the left plate of vacuum tube V2, and one end of condenser 708. A resistor 467 is connected between ground and one end of condenser 708. The screen and cathode of gas tube G2 are interconnected at a point common to relay R394P, the other side of which is connected to line 624. The cathode of the gas tube is connected to a resistor 484 and a condenser 715. The other end of this condenser is connected to the control grid of the tube and to one end of resistor 480. The other end of this resistor is connected to a pair of resistors 482 and 483. The plate of the tube is connected through a resistor 481 and contacts R392m, to line 623.

As the ripple circuit ring which includes relays R376 through R390 advances relay by relay in a step-by-step fashion so as to cause a comparison of a different voltage standard with the stored voltage along lines 436 (see also Fig. 1b) and 437 which represents the total vehicle weight, circuits are formed whereby a resultant comparison voltage impulse is applied to the left plate of vacuum tube V1. For example, after relay R376LP is energized, a circuit will be completed from line 437 (Fig. 1c) through contacts R392c, resistor 458, contacts R388a n/c, R387a n/c, R385a n/c, R384a n/c, R382a n/c, R381a n/c, R379a n/c, R378a n/c, R377a n/c and R376a n/o, resistor 457 through 439, to the +250 volt line 612. It will be recalled that the total vehicle weight voltage appears across lines 436 and 437 because this weight voltage actually is the sum of the voltages stored in the individual axle weight condensers S1 through S10 (see also Fig. 1b) which have been combined on an axle per vehicle basis. In order for the comparison circuit to function properly, the polarity of the total vehicle weight voltage stored in the condensers must be positive along line 437 and negative along line 436. Hence, so long as the standard comparison voltage picked off any of the resistors 439 through 457 is of a lower magnitude than the total weight voltage stored in the combined axles per vehicle condensers, a negative voltage will be applied to the left plate of vacuum tube V1. However, as soon as a ripple circuit relay, such as relay R385LP for example, is energized, to cause a positive voltage to be applied to the left plate of vacuum tube V1, end classify relay R394P (Fig. 1c) will be picked. In particular, if it is assumed that relay R385 has just been picked, a circuit will be completed to the left plate of vacuum tube V1 from +250 volt line 612 through resistors 439 through 443, contacts R385a n/o, R387a n/c, and R388a n/c, resistor 485, contacts R392c, line 437 (see also Fig. 1b), the total vehicle weight storage condensers on an axles per vehicle basis, line 436 (see also Fig. 1c) and contacts R392a. Inasmuch as the standard voltage is greater than the stored voltage, this will cause the left half of tube V1 to conduct, whereby the cathodes will go positive, and above ground potential. Inasmuch as the right plate of tube V1 is connected to line 617 and then to ground, that portion of the tube will stop conducting and a positive pulse will appear at the control grid of the left triode of vacuum V2. This will cause a negative pulse to appear on the right grid of the tube V2, whereby a pulse sufficiently higher than the cathode potential will be directed to the control grid of gas tube G2. As a result thereof, the gas tube will fire, and when the cathode potential thereof is increased, relay R394P will be energized. It is to be observed that although the plate of gas tube G2 is connected to line 623 which, in turn, is connected to line 622 (Fig. 1c) via diode D28, the gas tube can fire even when the line 622 goes negative, due to the charge remaining in condenser 712.

To clarify this operation, assume for instance that after relay R385LP (Fig. 1c) has been energized, end classify relay R394P will be energized. The ripple circuit arrangement is such that even after relay R394 has been energized, when line 621 goes positive, relay R384LT will be energized via contacts R384c n/o and R385d. However, when line 622 goes positive next, contacts R394e will be separated to prevent a circuit from being formed to any of the ripple relay latch pick coils. Thus, only ripple circuit relay R385 will remain picked.

Relay R368LP will become energized from line 622 through contacts R394h n/o and R391h, diode D27, to line 621, as a result of the picking of relay R394P. The transfer of contacts R368c will cause the drop out of relay R391 when coil R391LT is energized.

During a toll recorder operation, start classify relay R392 (Fig. 1a) and end classify relay R394 are caused to drop out when cam contacts C1 separate. As a result, relay R394 will drop out and contacts R394h (Fig. 1c) will cause relay R368LT to energize, whereas contacts R394e will close, so that the classification ripple circuit will continue from the last relay point reached during the classification operation. Assuming that the last ripple circuit relay picked was R385, consequent upon the deenergization of end classify relay R394, the ripple circuit timing ring would advance from relay R387LP, R385LT, R388LP, R387LT, R390LP and R388LT. It may be seen that relay R376LP cannot be energized at this time because start classify relay contacts R391b are separated. Inasmuch as relay R376 cannot be picked, relay R390LT cannot be energized because contacts R376d are separated. As a result, the ripple circuit timing ring will be reset to a position where only relay R390 will remain picked until another dynamic weight classification determination is to be made, at which time the start classify relay, such as relay R391 for example, will be energized.

While there have been shown and described and pointed out the fundamental novel features of the invention as applied to a preferred embodiment, it will be understood that various omissions and substitutions and changes in the form and details of the device illustrated and in its operation may be made by those skilled in the art, without departing from the spirit of the invention. It is the intention, therefore, to be limited only as indicated by the scope of the following claims.

What is claimed is:

1. In a relay timing ring of the type wherein at least one of a plurality of successively arranged electrically governed mechanical latch type relays is in a latched condition; a plurality of latch pick relay coils, one for each said relay, connected at one end thereof one to the other; a corresponding number of latch trip relay coils, one for each relay, connected at one end thereof one to the other; a plurality of successively arranged relay ring positions each having circuit means for operatively connecting a relay latch pick coil and a second preceding relay latch trip coil to a pair of second preceding relay controlled transfer contacts and a pair of next preceding relay stepping contacts, so that a circuit may be completed to the second preceding relay latch trip coil when said second preceding relay is operated, and to the relay latch pick coil when said second preceding relay is disabled; a pair of asymmetrically arranged diodes connected in series circuit between the common interconnections of said latch pick and said latch trip relay coils; and A. C. power supply; a first electrical line for connecting one side of said power supply to one side of each of said relay stepping contacts; a second electrical line for connecting the other side of said power supply to a point common to said diodes, whereby a second preceding latch trip coil will be energized during one polarity portion of the A. C. power wave via one of said diodes and a latch pick coil will be energized during the other one polarity portion of the A. C. power wave via the other one of said diodes.

2. In a relay timing ring of the type wherein at least one relay is always picked; a chain of electrically governed mechanical latch type relays each having a latch pick coil and a latch trip coil for respectively latching and unlatching an associated one of said relays; a pair of normally open stepping contacts and a pair of transfer contacts having normally open and normally closed points common to each of said relays; a plurality of latch pick coil operating circuits, one for each of said latch pick coils, each of which is controlled by said stepping contacts of a next preceding one of said relays and the normally closed points of said transfer contacts of the second preceding one of said relays; a plurality of latch trip coil operating circuits, one for each of said latch trip coils, each of which is controlled by said stepping contacts of a next following one of said relays and the normally open points of said transfer contacts of the one of said relays associated with the latch trip coil; a pair of diode rectifiers; an alternating current power source for supplying alternating current power to said rectifiers connected thereto in such a manner that each of said rectifiers conducts during respective opposite polarity portions of the alternating current delivered by said power source; and circuit means for connecting said latch pick and said latch trip coil operating circuits to the first and the second, respectively, of said pair of diode rectifiers so that latch pick and latch trip coils associated with successive ones of said relays in said chain are energized successively in response to each opposite polarity portion of the alternating current, whereby said relay timing ring is advanced step-by-step.

3. In a relay timing ring of the type wherein at least one relay is always picked; a chain of electrically governed mechanical latch type relays each having a relay operating coil and a relay disabling coil; stepping contacts and switching contacts common to said relays; a plurality of first relay governing circuits, one for each of said relay operating coils, each effective through the stepping contacts of a next preceding one of said relays and the switching contacts of the second preceding one of said relays; a plurality of second relay governing circuits, one for each of said relay disabling coils, each effective through the stepping contacts of a next following one of said relays and the switching contacts of the one of said relays associated with the relay disabling coil; a pair of asymmetrically arranged diode rectifiers so connected as to be common to each of the plurality of said first and said second relay governing circuits; an alternating current power source; and electrical means for so connecting said power source to said diode rectifiers that the next preceding and the next following ones of the relays in said relay chain are disabled and operated, respectively, during each alternating current polarity change, whereby said relay chain is advanced step-by-step.

References Cited in the file of this patent

UNITED STATES PATENTS

| | | |
|---|---|---|
| 1,813,969 | Smith | July 14, 1931 |
| 2,067,151 | Dicke | Jan. 5, 1937 |
| 2,563,824 | Dunlap | Aug. 14, 1951 |
| 2,574,904 | Bellamy | Nov. 13, 1951 |
| 2,593,578 | Liberg | Apr. 22, 1952 |